(12) United States Patent
Reno

(10) Patent No.: US 7,303,164 B1
(45) Date of Patent: Dec. 4, 2007

(54) FISHING LINE PACKAGE AND DISPENSER AND METHOD

(76) Inventor: Susan Reno, 4627 Tibbs, Shreveport, LA (US) 71105

( * ) Notice: Subject to any disclaimer, the term of this patent is extended or adjusted under 35 U.S.C. 154(b) by 7 days.

(21) Appl. No.: 11/433,254

(22) Filed: May 12, 2006

(51) Int. Cl.
B65H 49/20 (2006.01)
B65D 85/00 (2006.01)
A01K 87/00 (2006.01)

(52) U.S. Cl. ............... 242/588.4; 242/590; 206/395; 43/25

(58) Field of Classification Search ........... 242/129.51, 242/129.8, 134, 902, 588.3, 588.4, 590, 163; 43/25, 25.2, 54.1; 206/395, 396
See application file for complete search history.

(56) References Cited

U.S. PATENT DOCUMENTS

| | | | | |
|---|---|---|---|---|
| 1,826,084 A * | 10/1931 | Mohr | ...................... | 242/137.1 |
| 2,048,307 A * | 7/1936 | Weber | ........................ | 242/146 |
| 2,527,401 A * | 10/1950 | Daoust | ........................ | 206/408 |
| 2,890,821 A * | 6/1959 | Becker | ........................ | 225/43 |
| 2,993,661 A | 7/1961 | D'Arrigo | ..................... | 242/106 |
| 3,129,810 A * | 4/1964 | Wilkens | .................... | 242/532.6 |
| 3,261,569 A | 7/1966 | Bedell | ......................... | 242/136 |
| 3,298,127 A | 1/1967 | Bedell | ........................ | 43/25.2 |
| 3,399,847 A * | 9/1968 | Slate | ........................ | 242/129.6 |
| 3,402,501 A * | 9/1968 | Davis | .......................... | 43/25.2 |
| 3,776,485 A | 12/1973 | Foley et al. | ................. | 242/106 |
| 3,799,471 A | 3/1974 | Morris et al. | .......... | 242/84.1 R |
| 3,950,881 A | 4/1976 | Hays | ............................. | 43/25 |
| 3,957,224 A * | 5/1976 | Smith | ...................... | 242/129.6 |
| 3,964,606 A * | 6/1976 | Hogg et al. | ................. | 206/395 |
| 4,279,376 A * | 7/1981 | Roccaforte | .................. | 229/223 |
| 4,287,986 A * | 9/1981 | Beck | ........................... | 206/765 |
| 4,290,223 A * | 9/1981 | Ostenberg et al. | .......... | 43/54.1 |
| 4,378,903 A * | 4/1983 | Sherwood | ............. | 229/117.18 |
| 4,787,168 A * | 11/1988 | Benit et al. | .................. | 43/25.2 |
| 4,922,644 A | 5/1990 | Sherbondy | ...................... | 43/25 |
| 5,704,479 A * | 1/1998 | Barnett et al. | ............. | 206/395 |
| 5,740,959 A * | 4/1998 | Savage | .................... | 229/103.3 |
| 5,839,687 A * | 11/1998 | Magnafici | ................ | 242/404.3 |
| 6,609,673 B1 | 8/2003 | Johnson | ................... | 242/423.1 |
| 6,640,484 B1 | 11/2003 | Russow | ......................... | 43/25 |
| 6,647,697 B1 * | 11/2003 | Zarrow et al. | ................ | 53/452 |
| 6,742,737 B1 | 6/2004 | Conner | ....................... | 242/323 |
| 2004/0031877 A1* | 2/2004 | Smith | ...................... | 242/588.4 |

\* cited by examiner

*Primary Examiner*—Peter M. Cuomo
*Assistant Examiner*—Evan H. Langdon
(74) *Attorney, Agent, or Firm*—R. Keith Harrison

(57) ABSTRACT

A fishing line package and dispenser is disclosed. An illustrative embodiment of the fishing line package and dispenser includes a housing, a fishing line spool provided in the housing, a fishing line wound on the fishing line spool, a display tab extending from the housing and an attachment tab carried by the display tab and adapted to detachably engage the housing. A method of transferring fishing line to a reel of a fishing rod is also disclosed.

14 Claims, 3 Drawing Sheets

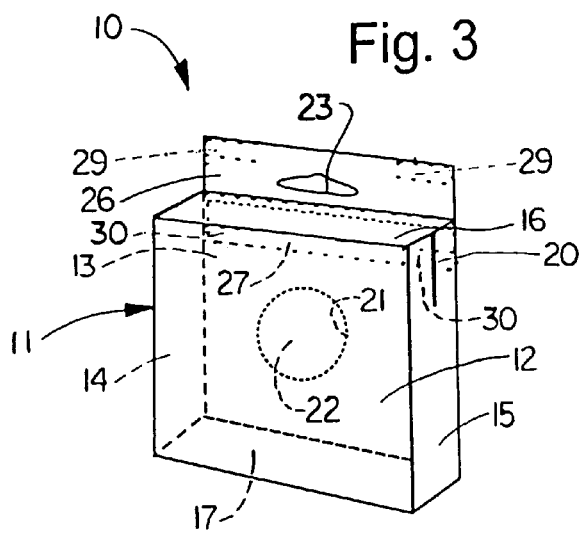
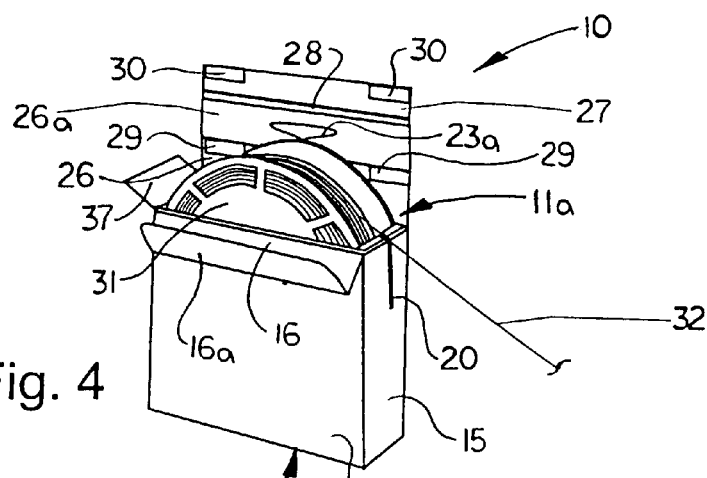
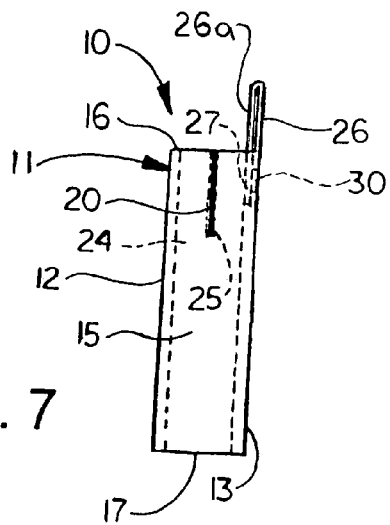

FISHING LINE PACKAGE AND DISPENSER AND METHOD

FIELD

The present invention relates to fishing accessories. More particularly, the present invention relates to a fishing line package which can be displayed for marketing purposes and includes fishing line that can be dispensed or transferred from the fishing line package and onto a reel of a fishing rod. The present invention further relates to a method of transferring fishing line to a reel of a fishing rod.

BACKGROUND

A typical fishing rod and reel includes an elongated, flexible rod having a reel and a handle at one end. Fishing line is wound on a rotating line spindle provided in the reel and extended from the line spindle typically through guide loops provided at spaced intervals along the rod. A bait or lure and a hook and sinker are attached to the end of the fishing line and cast into a water body by grasping the handle while tossing the rod in a forward motion.

During fishing, a portion of the fishing line extending from a fishing rod frequently becomes tangled, and therefore, must be cut from the main portion of fishing line wound on the reel. Furthermore, after a cast the hook frequently becomes snagged or hung on stumps and the like, oftentimes rendering it necessary to break the fishing line. Therefore, over time the segment of fishing line wound on the reel becomes increasingly shorter such that it is eventually necessary to replace the fishing line on the reel. This is typically carried out by transferring the fishing line onto the reel from a spool on which replacement fishing line is wound. However, this can be a cumbersome exercise and frequently requires two persons.

SUMMARY

The present invention is generally directed to a fishing line package and dispenser. An illustrative embodiment of the fishing line package and dispenser includes a housing, a fishing line spool provided in the housing, a fishing line wound on the fishing line spool, a display tab extending from the housing and an attachment tab carried by the display tab and adapted to detachably engage the housing.

The present invention is further directed to method of transferring fishing line to a reel of a fishing rod. An illustrative embodiment of the method includes providing a fishing line package and dispenser comprising a housing, a fishing line spool provided in the housing, fishing line wound on the fishing line spool, a display tab extending from the housing, and an attachment tab carried by the display tab and detachably attached to the housing; extending the fishing line from the housing; detaching the attachment tab from the housing; securing the attachment tab against the fishing rod; attaching the fishing line to the reel; and winding the fishing line onto the reel.

BRIEF DESCRIPTION OF THE DRAWINGS

The invention will now be described, by way of example, with reference to the accompanying drawings, in which:

FIG. 3 is a front perspective view of an illustrative embodiment of the fishing line package and dispenser, with a housing element of the fishing line package and dispenser in a closed configuration and a display tab element of the fishing line package and dispenser folded in a display configuration;

FIG. 4 is a front perspective view of an illustrative embodiment of the fishing line package and dispenser, with a housing element of the fishing line package and dispenser shown in an open, spool-receiving configuration and a fishing line spool partially inserted in the housing element of the fishing line package and dispenser;

FIG. 7 is a side view of an illustrative embodiment of the fishing line package and dispenser, with a housing element of the fishing line package and dispenser in a closed configuration and a display tab element of the fishing line package and dispenser folded in a display configuration.

DETAILED DESCRIPTION

Figure 1:
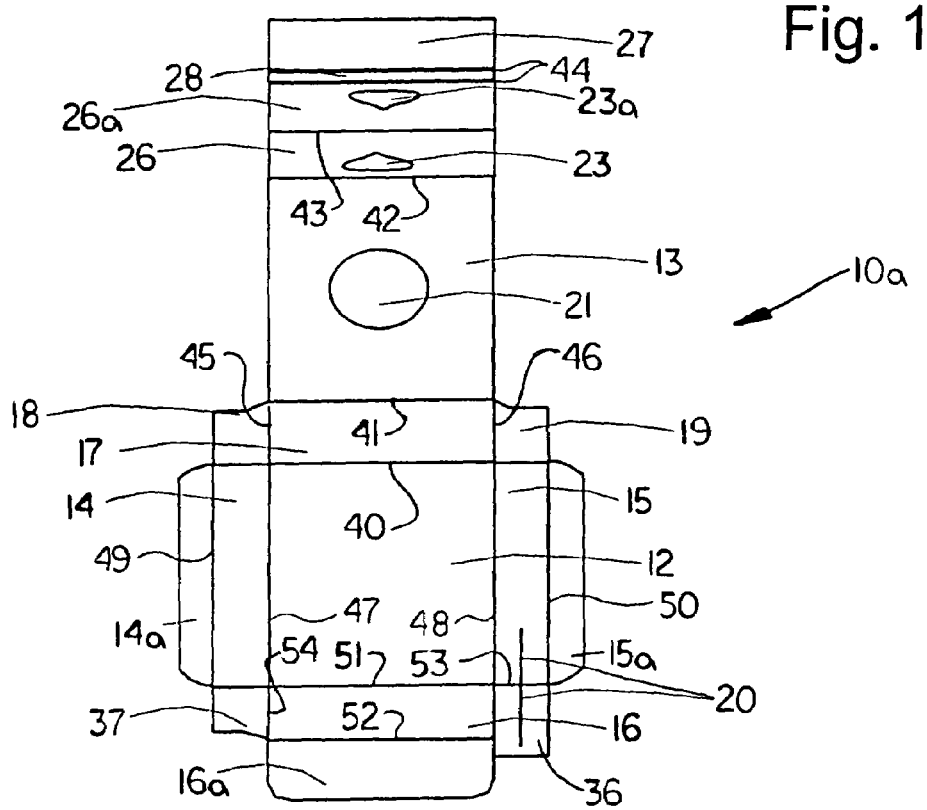
FIG. 1 is a top view of a blank suitable for fabrication of an illustrative embodiment of the fishing line package and dispenser, shown in an unfolded configuration.

Referring initially to FIGS. 3-5 and 7 of the drawings, an illustrative embodiment of the fishing line package and dispenser is generally indicated by reference numeral 10. Unless otherwise noted, the various components of the fishing line package and dispenser 10 may be a cardboard or paperboard material, for example. Alternatively or additionally, all or some components of the fishing line package and dispenser 10 may be plastic. The fishing line package and dispenser 10 includes a housing 11 typically having a front panel 12; a rear panel 13 spaced-apart from the front panel 12; a pair of side panels 14 and 15, respectively, extending between the front panel 12 and the rear panel 13; and a bottom panel 17 which extends between the front panel 12, the rear panel 13 and the side panels 14 and 15. As illustrated in FIG. 4, the housing 11 has a housing interior 11a. A top panel 16 extends between the front panel 12, the rear panel 13 and the side panels 14 and 15 and closes the housing interior 11a of the housing 11, as illustrated in FIGS. 3 and 7. As illustrated in FIG. 4, in some embodiments of the fishing line package and dispenser 10, the top panel 16 is pivotally attached to the front panel 12 and can be selectively opened and closed on the housing 11. A top panel tab 16a may extend from the top panel 16 for insertion between the top panel 16 and an attachment tab 27, as illustrated in FIG. 7 and will be hereinafter described, or alternatively, between the rear panel 13 and the top panel 16, when the top panel 16 is closed on the housing 11.

As further illustrated in FIG. 4, a fishing line spool 31, on which is wound a supply of fishing line 32, is provided in the housing interior 11a of the housing 11. A line slit 20 is provided in the side panel 15 of the housing 11. As illustrated in FIG. 7, a line resistance strip 24 (shown in phantom) may be provided in the housing interior 11a, adjacent to or against the interior surface of the side panel 15. The line resistance strip 24 may be plastic, rubber or foam rubber, in non-exclusive particular. A line slit 25 is provided in the line resistance strip 24 and generally registers with the line slit 20 provided in the side panel 15 of the housing 11. As illustrated in FIG. 4 and will be hereinafter described, in typical application of the fishing line package and dispenser 10, the fishing line 32 is partially unwound from the fishing line spool 31 and extended from the housing interior 11a through the line slit 25 of the line resistance strip 24 and the line slit 20 of the side panel 15. As illustrated in FIG. 3, an opening 21 (shown in phantom) may be provided in the rear panel 13 of the housing 11 for purposes which will be hereinafter described. In a display configuration of the fishing line package and dispenser 10, the opening 21 may be closed by an opening panel 22 which is attached to the edge of the opening 21 along multiple perforations.

A display tab 26 extends from the rear panel 13 of the housing 11, beyond the top panel 16. A rod slot 23 extends through the display tab 26. The rod slot 23 facilitates hanging of the housing 11 on a display hanging rod (not illustrated) in a retail outlet such as a sporting goods store or the like, for example, during marketing display of the fishing line package 10, as will be hereinafter further described. Various marketing and product identification indicia or labeling (not illustrated), such as trademarks and the like, may be provided on the exterior surfaces of the housing 11 and display tab 26.

Figure 5:
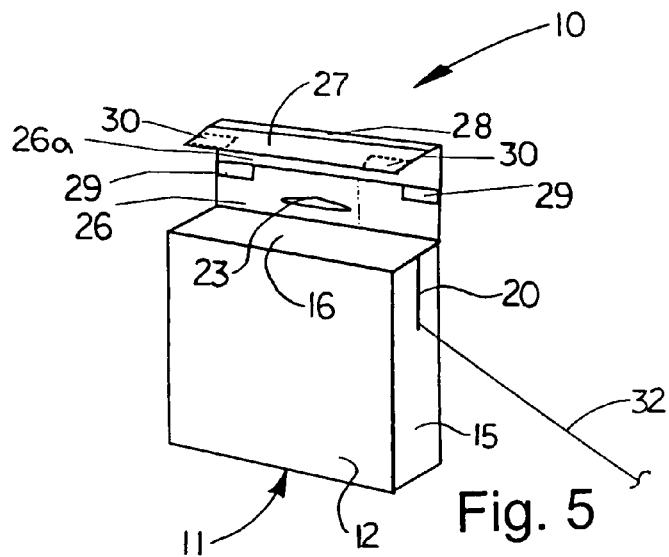
FIG. 5 is a front perspective view of an illustrative embodiment of the fishing line package and dispenser, more particularly illustrating folding of an attachment tab element with respect to a reinforcing display tab element preparatory to attachment of the fishing line package and dispenser to a fishing rod.

As illustrated in FIGS. 4 and 5, a reinforcing display tab 26a typically extends from the display tab 26. A rod slot 23a extends through the reinforcing display tab 26a. An attachment tab 27 extends from the reinforcing display tab 26a. The attachment tab 27 may be connected to the reinforcing display tab 26a by a connecting portion 28. In some embodiments, the reinforcing display tab 26a is omitted from between the display tab 26 and the attachment tab 27, in which case the attachment tab 27 extends from the display tab 26.

As illustrated in FIGS. 3 and 7, in a display configuration of the fishing line package and dispenser 10, the reinforcing display tab 26a can be folded forwardly with respect to the display tab 26 and the attachment tab 27 detachably attached to the interior surface of the rear panel 13 in the housing interior 11a of the housing 11, as illustrated in FIG. 7. The attachment tab 27 can be detachably attached to the interior surface of the rear panel 13 using any suitable technique known by those skilled in the art. For example, at least one attachment strip 30 may be provided for attaching the attachment tab 27 to the interior surface of the rear panel 13. The at least one attachment strip 30 may be an adhesive such as glue or a hook-and-loop fastener, in non-exclusive particular. When the attachment tab 27 is attached to the interior surface of the rear panel 13, the rod slot 23a of the reinforcing display tab 26a generally registers with the rod slot 23 of the display tab 26. Alternatively, the reinforcing display tab 26a can be folded rearwardly with respect to the display tab 26 and the attachment tab 27 detachably attached to the rear surface of the rear panel 13.

Figure 6:
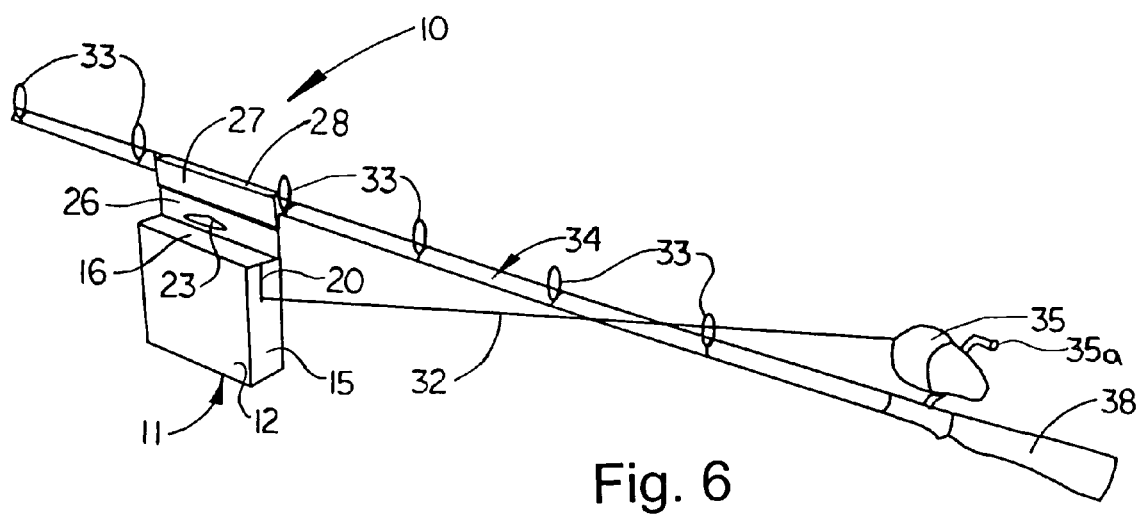
FIG. 6 is a perspective view of a fishing rod, with an illustrative embodiment of the fishing line package and dispenser attached to the fishing rod and further illustrating transfer of a fishing line from the fishing line package and dispenser to a reel provided on the fishing rod.

As illustrated in FIGS. 4 and 5, in a line-dispensing configuration of the fishing line package and dispenser 10, the attachment tab 27 can be detached typically from the interior surface of the rear panel 13 and attached to the front surface of at least one of the display tab 26 and the reinforcing display tab 26a. This facilitates attachment of the fishing line package and dispenser 10 to a fishing rod 34, as illustrated in FIG. 6 and will be hereinafter described. The attachment tab 27 can be detachably attached to the front surface of at least one of the display tab 26 and the reinforcing display tab 26a using any suitable technique known by those skilled in the art. For example, at least one attachment strip 29 may be provided for attaching the attachment tab 27 to the display tab 26 and/or the reinforcing display tab 26a. The at least one attachment strip 29 may be an adhesive or a hook-and-loop fastener, in non-exclusive particular. In embodiments in which the reinforcing display tab 26a is omitted, the attachment tab 27 can be attached to the front or rear surface of the display tab 26 in the display configuration of the fishing line package and dispenser 10 and to the front surface of the display tab 26 in the line-dispensing configuration of the fishing line package and dispenser 10.

Figure 2:
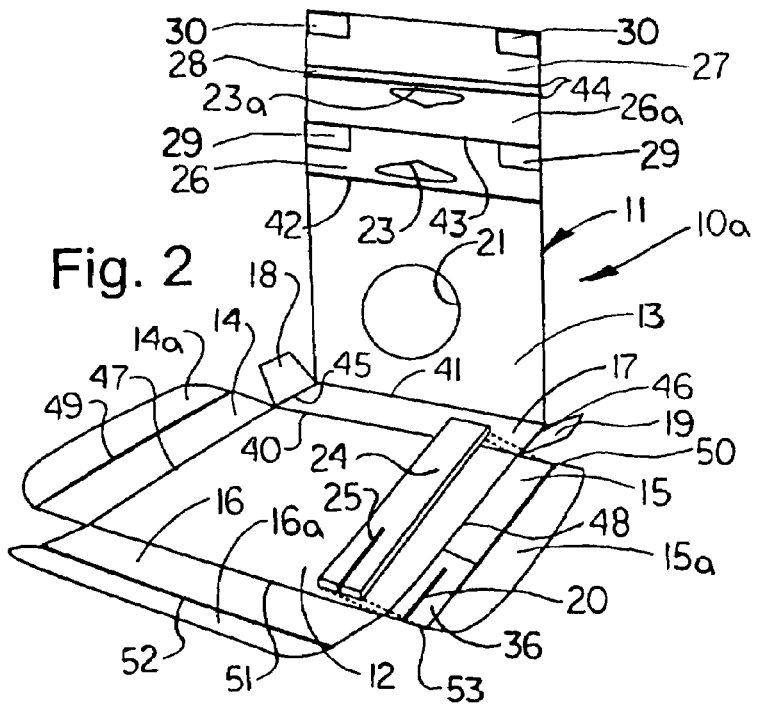
FIG. 2 is a front perspective view of a blank suitable for fabrication of an illustrative embodiment of the fishing line package and dispenser, shown in a partially folded configuration.

Referring initially to FIGS. 1 and 2 of the drawings, an illustrative method of fabricating the fishing line package and dispenser 10 by folding a blank 10a is illustrated. It is to be understood that fabrication of the fishing line package and dispenser 10 by folding the blank 10a represents just one possible method of fabrication and that the fishing line package and dispenser 10 may be fabricated using any of a variety of suitable alternative techniques. The blank 10a includes a front panel 12 and a bottom panel 17 connected to the front panel 12 along a bottom panel fold line 40. A rear panel 13 is connected to the bottom panel 17 along a rear panel fold line 41, a display tab 26 is connected to the rear panel 13 along a display tab fold line 42, a reinforcing display tab 26a is connected to the display tab 26 along a reinforcing tab fold line 43, and an attachment tab 27 is connected to the reinforcing display tab 26a along at least one connecting portion fold line 44. In some embodiments, a pair of connecting portion fold lines 44 connects the attachment tab 27 to the reinforcing display tab 26a and a connecting portion 28 extends between the connecting portion fold lines 44.

A side tab 18 and a side tab 19 are connected to the bottom panel 17 along a side tab fold line 45 and a side tab fold line 46, respectively. A side panel 14 and a side panel 15 are attached to opposite edges of the front panel 12 along side panel fold lines 47 and 48, respectively. A side panel tab 14a is attached to the side panel 14 along a tab fold line 49, and a side panel tab 15a is attached to the side panel 15 along a tab fold line 50.

As illustrated in FIG. 1, a fold tab 37 (not illustrated in FIG. 2) may be attached to the top panel 16 along a fold tab fold line 54. The fold tab 37 is typically separate from the adjacent side panel 14. A reinforcing tab 36 is attached to the side panel 15 along a reinforcing tab fold line 53 and is typically separate from the adjacent top panel 16. A continuous line slit 20 extends through a portion of the side panel 15 and a portion of the reinforcing tab 36. A top panel 16 is attached to the front panel 12 along a top panel fold line 51. A top panel tab 16a is attached to the top panel 16 along a panel tab fold line 52.

The fishing line package and dispenser 10 is fabricated by folding the blank 10a along the various fold lines and attaching the various components of the blank 10a to each other. Accordingly, the front panel 12 is folded with respect to the bottom panel 17 along the bottom panel fold line 40; the rear panel 13 is folded with respect to the bottom panel 17 along the rear panel fold line 41; and the side panels 14 and 15 are folded with respect to the front panel 12 along the side panel fold lines 47 and 48, respectively. The side tabs 18 and 19 are folded with respect to the side tab fold lines 45 and 46, respectively, and glued or otherwise attached to the inside surfaces of the side panels 14 and, 15, respectively.

As illustrated in FIG. 2, the reinforcing tab 36 is folded along the reinforcing tab fold line 53, against the inside surface of the side panel 15 such that the line slit 20 in the reinforcing tab 36 is generally aligned with the line slit 20 in the side panel 15. The reinforcing tab 36 may be glued or otherwise attached to the side panel 15. A line resistance strip 24 may be glued or otherwise attached to the inside surfaces of the side panel 15 and the reinforcing tab 36, with a line slit 25 in the line resistance strip 24 generally aligned with the line slits 20 in the side panel 15 and reinforcing tab 36, respectively.

The side panel tab 14a is folded with respect to the side panel 14 along the tab fold line 49 and the side panel tab 15a is folded with respect to the side panel 15 along the tab fold line 50. The side panel tabs 14a and 15a are each glued or otherwise attached to the inside surface of the rear panel 13 to complete fabrication of the housing 11. In the closed configuration of the housing 11, illustrated in FIG. 3, the top panel tab 16a (FIGS. 1 and 2) can be inserted between the top panel 16 and the attachment tab 27 (after attachment of the attachment tab 27 to the interior surface of the rear panel 13 in the display configuration) or between the top panel 16 and the rear panel 13 (in embodiments in which the attachment tab 27 is attached to the rear surface of the rear panel 13 in the display configuration) to close the housing interior 11a of the housing 11.

Referring next to FIGS. 3-7 of the drawings, in typical application, the fishing line package and dispenser 10 is initially packaged in the display configuration illustrated in FIGS. 3 and 7 for purposes of marketing the fishing line package and dispenser 10. The fishing line package and dispenser 10 is then obtained by a user and attached to a fishing rod 34, as illustrated in FIG. 6, to transfer the wound fishing line 32 from the fishing line spool 31 (FIG. 4) in the housing 11 of the fishing line package and dispenser 10 and onto a reel 35 provided on the fishing rod 34. The fishing rod 34 may be conventional and typically includes an open-bail or closed-bail reel 35 and a handle 38 provided at one end of the fishing rod 34. A line spindle (not illustrated) is rotatably mounted in the reel 35 and engaged for rotation in a selected forward or reverse direction by a reel handle 35a. Multiple fishing line guide loops 33 may be provided on the fishing rod 34 in spaced-apart relationship to each other.

In the display configuration of the fishing line package and dispenser 10 illustrated in FIGS. 3 and 7, the fishing line spool 31 (FIG. 4), on which is wound the fishing line 32, is contained in the housing interior 11a of the housing 11, as illustrated in FIG. 4. As illustrated in FIG. 7, during fabrication and packaging, the reinforcing display tab 26a is folded forwardly with respect to the display tab 26. The attachment tab 27 is typically inserted in the housing interior 11a of the housing 11 and detachably attached to the interior surface of the rear panel 13, such as by using the attachment strip or strips 30, for example. Accordingly, the rod slot 23a (FIG. 1) of the reinforcing display tab 26a is generally aligned with the rod slot 23 of the display tab 26. The top panel 16 of the housing 11 is closed typically by insertion of the top panel tab 16a between the attachment tab 27 and the top panel 16. Alternatively, the attachment tab 27 may be detachably attached to the rear surface of the rear panel 13, in which case the top panel tab 16a is inserted between the top panel 16 and the rear panel 13 of the housing 11. The housing 11 may be wrapped in cellophane (not illustrated) prior to marketing, typically in conventional fashion. The fishing line package and dispenser 10 can be displayed in a retail establishment or the like by, for example, inserting a hanging rod (not illustrated), which is attached to a peg board (not illustrated) or the like, through the rod slots 23, 23a and hanging the fishing line package and dispenser 10 on the hanging rod.

After purchase of the fishing line package and dispenser 10, the housing 11 is opened typically by removing the top panel tab 16a typically from between the attachment tab 27 and the top panel 16 of the housing 11 and extending the top panel 16 from the front panel 12, as illustrated in FIG. 4, to open the housing interior 11a. The fishing line spool 31 is then partially removed from the housing interior 11a and the end segment of the fishing line 32 is unwound from the fishing line spool 31. The end segment of the fishing line 32 unwound from the fishing line spool 31 is inserted through the line slit 20 provided in the side panel 15 and through the line slit 25 (FIG. 2) provided in the line resistance strip 24 on the interior surface of the side panel 15, as illustrated in FIGS. 4 and 5.

The fishing line package and dispenser 10 is attached to the fishing rod 34 by detaching the attachment tab 27 typically from the interior surface of the rear panel 13 and initially extending the attachment tab 27 in coplanar relationship to the reinforcing display tab 26a, as illustrated in FIG. 4. The attachment tab 27 is then bended forwardly with respect to the reinforcing display tab 26a and the fishing rod 34 is placed between the reinforcing display tab 26a and the attachment tab 27, after which the attachment tab 27 is attached to the front surface of at least one of the display tab 26 and the reinforcing display tab 26a, as illustrated in FIG. 6, such as via the at least one attachment strip 29. The end segment of the fishing line 32 is then further pulled from the housing 11 through the line slit 20 and attached to the line spindle (not illustrated) of the reel 35. Next, the fishing line 32 is pulled from the fishing line spool 21 in the housing 11 and wound on the line spindle of the reel 35 by rotating the reel handle 35a of the reel 35 in the reverse direction. As the fishing line 32 is pulled from the line slit 20, the line resistance strip 24 applies resistance to the fishing line 32 through the line slit 25 (FIG. 2) of the line resistance strip 24, thereby maintaining tension in the fishing line 32 between the housing 11 and the reel 35 as the fishing line 32 is wound on the line spindle of the reel 35. The opening panel 22 (FIG. 3) can be detached from the rear panel 13 of the housing 11 to open the opening 21 in the rear panel 13. If needed, the fishing line spool 31 can be manually rotated through the opening 21 during transfer of the fishing line 32 to the reel 35 in the event that rotation of the fishing line spool 31 in the housing interior 11a is inadvertently hindered, for example.

After the desired quantity of the fishing line 32 is transferred from the fishing line spool 31 to the reel 35, the portion of the fishing line 32 which is wound on the reel 35 is cut away from the housing 11. The cut end of the fishing line 32 is then extended through the fishing line guide loops 33 and then rigged and baited typically in conventional fashion for use of the fishing rod 34. The fishing line package and dispenser 10 is detached from the fishing rod 34 and then typically stored for later transfer of additional fishing line 32 from the fishing line package and dispenser 10 onto a reel 35 of the same or a different fishing rod 34, as needed.

While the preferred embodiments of the invention have been described above, it will be recognized and understood that various modifications can be made in the invention and the appended claims are intended to cover all such modifications which may fall within the spirit and scope of the invention.

What is claimed is:

1. A fishing line package and dispenser, comprising:
   a housing;
   a fishing line spool provided in said housing;
   fishing line wound on said fishing line spool;
   a display tab extending from said housing;
   a reinforcing display tab extending from said display tab;
   an attachment tab extending from said reinforcing display tab and adapted to detachably engage said housing;
   a line slit provided in said housing; and
   a line resistance strip provided in said housing and having a second line slit generally aligned with said line slit provided in said housing.

2. The fishing line package and dispenser of claim 1 further comprising an opening provided in said housing adjacent to said fishing line spool.

3. The fishing line package and dispenser of claim 1 wherein said housing comprises a front panel; a rear panel spaced-apart from said front panel; a pair of spaced-apart side panels extending between said front panel and said rear panel; a bottom panel extending between said front panel, said rear panel and said side panels; and a top panel carried by said front panel, said rear panel and said side panels and wherein said display tab extends from said rear panel.

4. The fishing line package and dispenser of claim 1 further comprising a first attachment strip carried by said display tab and a second attachment strip carried by said attachment tab.

5. The fishing line package and dispenser of claim 4 wherein said first attachment strip and said second attachment strip each comprises an adhesive.

6. The fishing line package and dispenser of claim 4 wherein said first attachment strip and said second attachment strip each comprises hook and loop fasteners.

7. A fishing line package and dispenser, comprising:
   a housing;
   a fishing line spool provided in said housing;
   fishing line wound on said fishing line spool;
   a display tab having a first edge attached to said housing and a second edge spaced-apart from said first edge;
   a reinforcing display tab having a third edge attached to said second edge of said display tab and a fourth edge spaced-apart from said third edge; and
   an attachment tab having a fifth edge attached to said fourth edge of said reinforcing display tab and adapted to detachably engage said housing and at least one of said display tab and said reinforcing display tab.

8. The fishing line package and dispenser of claim 7 wherein said housing comprises a front panel; a rear panel spaced-apart from said front panel; a pair of spaced-apart side panels extending between said front panel and said rear panel; a bottom panel extending between said front panel, said rear panel and said side panels; and a top panel carried by said front panel, said rear panel and said side panels and wherein said display tab extends from said rear panel.

9. The fishing line package and dispenser of claim 8 further comprising a line slit provided in one of said side panels of said housing.

10. The fishing line package and dispenser of claim 9 further comprising a line resistance strip provided in said housing adjacent to said one of said side panels and having a second line slit generally aligned with said line slit provided in said housing.

11. The fishing line package and dispenser of claim 8 further comprising an opening provided in said rear panel adjacent to said fishing line spool.

12. The fishing line package of claim 7 further comprising a first attachment strip carried by said display tab and a second attachment strip carried by said attachment tab.

13. The fishing line package and dispenser of claim 12 wherein said first attachment strip and said second attachment strip each comprises an adhesive.

14. The fishing line package and dispenser of claim 12 wherein said first attachment strip and said second attachment strip each comprises hook and loop fasteners.

* * * * *